United States Patent Office 3,087,826
Patented Apr. 30, 1963

3,087,826
ELECTRICAL INSULATING COATING AND METHOD OF PRODUCING SAME
Vincent Chiola and Clarence D. Vanderpool, Towanda, Pa., assignors to Sylvania Electric Products Inc., a corporation of Delaware
No Drawing. Filed Mar. 9, 1961, Ser. No. 94,454
4 Claims. (Cl. 106—287)

This invention relates to coatings for electrical insulation purposes. More particularly, the invention is concerned with inorganic coatings of the magnesium oxide type which are adapted to be applied by spraying to the surfaces of insulator bodies, and to a method of producing such coatings of improved characteristics from the standpoints of their application and effectiveness after application.

Magnesium oxide or various other types of coatings are commonly applied to the surfaces of the mica spacer plates in a variety of types of electron tubes. The relatively rough surface afforded by the coating so applied affords an effectively longer electrical path between metallic portions of the tube mount, thus preventing or delaying tube failures caused by deposition of metal vaporized from other conductive portions of the tubes on the surfaces of the insulator plates.

Although magnesium oxide coatings have proved to be very effective for the aforementioned purpose in electron tube manufacture, some difficulties have been experienced in consistently obtaining adequate adherence of the coating to the mica spacers. When the adhesion of the coating is poor it tends to fall off during the handling of the tube mounts in the assembly of the tubes, thus necessitating rejection of the mounts and introducing concomitant increases in manufacturing costs of the tubes.

It has been found that the problem of obtaining consistently good adhesion of magnesium oxide coatings is related to the difficulties which have been experienced heretofore in providing magnesium oxide suspensions of sufficiently consistent and stable viscosity for application in the automated spraying equipment used in the electron tube industry. More particularly, the coating suspensions frequently have exhibited a tendency to increase in viscosity to an unpredictable extent, or even to gel, in the processing vessels in which they are prepared, in storage vessels, or in the spray equipment during application. Attempts to compensate for such increases in viscosity by adding additional suspending medium result in marked reduction in the adhesive properties of the coating.

It is, therefore, an object of the invention to provide a magnesium oxide coating material of suitable and stable viscosity for application of electrical insulation bodies.

It is a further object to provide a method for producing such magnesium oxide coating materials which avoids the problem of gelation of the material during production.

Heretofore, in preparing magnesium oxide coatings it has been the practice to add the magnesium oxide to deionized water in a tank, with agitation, to form a slurry. The temperature of the slurry tends to rise slightly during this operation. The slurry is immediately passed through a colloid mill and is then diluted and blended with ethyl alcohol to its final desired composition. The resulting suspension is then allowed to age overnight or for longer periods and a viscosity measurement is then made. If the viscosity is within the limits required for the automated spray application hereinabove referred to, the suspension is placed in containers for shipment or is run into storage tanks for early use.

In preparing magnesium oxide coating materials according to the procedure described in the preceding paragraph undesirable increases in viscosity or even gelation have frequently and unaccountably occurred, either before or after treatment of the slurries in the colloid mill, or during the aging after dilution with alcohol. Efforts to compensate for this difficulty by further dilution of the suspension commonly resulted in coatings having poor adhesion to the insulating bodies to which the suspensions were applied. Additionally, such dilution frequently resulted in suspensions having solid contents below the specified permissible range and resulting inadequate coverage of the insulating bodies. In cases where gelation has occurred in the processing vessels or in the spray equipment, substantial labor and expense has been involved in cleaning out the equipment and discarding the worthless material.

In the preparation of magnesium oxide coating compositions in accordance with the present invention, an aqueous solution of calcium hydroxide is employed as a suspending medium in the preparation of the initial magnesium oxide slurry. In addition, the slurry is maintained with mild agitation in a vessel for a brief "aging" period prior to reducing the magnesium oxide particles in size and more intimately admixing the particles with the suspending medium, as by passing the suspension through a colloid mill. During this aging period the magnesium oxide is hydrated sufficiently to produce a suspension which is substantially stable. After passage through the colloid mill the material is handled substantially in the manner which has been heretofore employed.

Briefly, then, in accordance with the method of the invention, a dilute solution of calcium hydroxide in water is first prepared. Magnesium oxide is then added to the solution with agitation until a slurry containing the desired amount of magnesium oxide is formed. The ratio of solids to water at this stage of the process depends on the solids content desired in the final composition. However, it has been found that for best results the amount of the calcium hydroxide (expressed as CaO) added to the water should be between about 2.0% and 10.0% of the weight of magnesium oxide to be added to the water.

After completion of the addition of the magnesium oxide to the calcium hydroxide solution, the resulting slurry is mildly agitated for a period of about one-half to two hours to permit hydration of the magnesium oxide. At the end of this aging period the slurry is passed through a colloid mill and into a mixing tank for dilution with ethyl alcohol to its final desired solids content. The suspension is again aged, preferably without agitation, sufficiently to insure that its viscosity remains substantially constant, and is then ready for use in spraying insulating bodies or packaging in containers for shipment.

In a typical preparation of coating compositions of the type herein disclosed 8 pounds of reagent grade calcium hydroxide were dissolved in 42.5 gallons of deionized water. Sixty pounds of magnesium oxide were then added to the solution with agitation to form a slurry. Agitation of the slurry was continued for about an hour to permit hydration of the magnesium oxide, and the slurry was then fed through a colloid mill and into a mixing tank. The viscosity of the slurry emerging from the colloid mill was slightly higher than the material fed to the mill. In the mixing tank the slurry was diluted with ethyl alcohol to a volume of about 95 gallons and, after being mixed, was allowed to stand overnight. During this period there was a further slight increase in viscosity. The resulting suspension was then passed through a 100 mesh screen and into containers for shipping. The Zahn Cup No. 1 viscosity of the suspension at the time it was placed in the shipping containers was about 30 seconds.

After storage for several weeks, the containers containing the magnesium oxide coating material prepared as described in the preceding paragraph were opened and the suspension was used to spray coat mica spacers for installation in vacuum tube amounts. It was found that the viscosity of the suspension had remained substantially unchanged during the storage period, no further dilution being required prior to spraying. Furthermore, after drying, the coating was found to have excellent adherence to the mica spacers.

What is claimed is:

1. A coating material for application to surfaces of electrical insulators consisting of magnesium oxide dispersed in a liquid medium, said medium consisting essentially of an aqueous solution of calcium hydroxide, the amount of calcium hydroxide in said solution, expressed as CaO, being between about 2 percent and about 10 percent of the weight of magnesium oxide.

2. A sprayable coating material for application to surfaces of electrical insulators consisting of magnesium oxide particles in suspension in a liquid medium, said liquid medium consisting essentially of a solution of calcium hydroxide in water and ethyl alcohol, the amount of calcium hydroxide in said solution, expressed as CaO, being between about 2 percent and about 10 percent of the weight of magnesium oxide in suspension.

3. The method of preparing a stable suspension of magnesium oxide in an aqueous suspending medium which comprises the steps of dispersing the magnesium oxide in a dilute aqueous solution of calcium hydroxide and maintaining the magnesium oxide in suspension therein to cause hydratin of the magnesium oxide, the amount of calcium hydroxide in said solution, expressed as CaO, being between about 2 percent and about 10 percent of the weight of magnesium oxide so dispersed.

4. The method of preparing a coating material for application to the surfaces of electrical insulators which comprises adding magnesium oxide to an aqueous solution of calcium hydroxide, the amount of calcium hydroxide in said solution, expressed as CaO, being between about 2 percent and about 10 percent of the weight of magnesium oxide so added, agitating the mixture to suspend the magnesium oxide in the solution, maintaining the magnesium oxide in suspension for a period of between about one-half and about two hours, subjecting the suspension to further dispersion in a colloid mill and thereafter adding sufficient ethyl alcohol to the suspension to produce a coating material of the desired solids content.

References Cited in the file of this patent

UNITED STATES PATENTS

| | | |
|---|---|---|
| 2,618,530 | Gardner | Nov. 18, 1952 |
| 2,636,244 | Williams | Apr. 28, 1953 |
| 2,948,631 | McAllister | Aug. 9, 1960 |